(12) United States Patent
Kihara et al.

(10) Patent No.: US 9,252,756 B2
(45) Date of Patent: Feb. 2, 2016

(54) RANDOM NUMBER GENERATING DEVICE

(71) Applicant: PANASONIC CORPORATION, Osaka (JP)

(72) Inventors: Hideyuki Kihara, Kanagawa (JP); Kazuyo Ohta, Chiba (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 59 days.

(21) Appl. No.: 14/042,664

(22) Filed: Sep. 30, 2013

(65) Prior Publication Data

US 2014/0028404 A1 Jan. 30, 2014

Related U.S. Application Data

(63) Continuation of application No. PCT/JP2012/000870, filed on Feb. 9, 2012.

(30) Foreign Application Priority Data

Apr. 7, 2011 (JP) .................................. 2011-085036

(51) Int. Cl.
*H03K 3/84* (2006.01)
*H04L 9/06* (2006.01)
*G06F 7/58* (2006.01)

(52) U.S. Cl.
CPC ........ *H03K 3/84* (2013.01); *G06F 7/588* (2013.01); *H04L 9/0662* (2013.01)

(58) Field of Classification Search
CPC ......... H03K 3/84; H04L 9/0662; G06F 7/588
USPC ................................................ 331/78; 341/67
See application file for complete search history.

(56) References Cited

U.S. PATENT DOCUMENTS

| 5,706,218 | A | * | 1/1998 | Hoffman ....................... 708/251 |
| 2004/0107230 | A1 | | 6/2004 | Bardouillet |
| 2006/0244544 | A1 | | 11/2006 | Suzuki |
| 2007/0063879 | A1 | * | 3/2007 | Moreaux et al. ................ 341/67 |
| 2012/0221616 | A1 | | 8/2012 | Yasuda et al. |

FOREIGN PATENT DOCUMENTS

| JP | 10-340183 A | 12/1998 |
| JP | 2003-108363 A | 4/2003 |

(Continued)

OTHER PUBLICATIONS

International Search Report issued in International Application No. PCT/JP2012/000870 with Date of mailing Mar. 7, 2012.

*Primary Examiner* — Jeffrey Shin
(74) *Attorney, Agent, or Firm* — McDermott Will & Emery LLP

(57) ABSTRACT

Provided is a random number generating device capable of generating highly irregular random numbers with a simple configuration. The random number generating device includes: a receiving unit including a receiving mechanism configured to receive, in a contactless manner, energy transmitted from a transmitting unit, the receiving unit being configured to convert the energy received by the receiving mechanism into a reception voltage; a voltage controlled oscillator configured to output an oscillating output signal based on the reception voltage; and a pseudorandom number generator configured to generate pseudorandom numbers varying in accordance with an oscillation frequency of the output signal from the voltage controlled oscillator.

5 Claims, 10 Drawing Sheets

(56) References Cited

FOREIGN PATENT DOCUMENTS

| JP | 2004-288159 A | 10/2004 |
| JP | 2005-304833 A | 11/2005 |
| JP | 2005-304834 A | 11/2005 |
| JP | 2006-294001 A | 10/2006 |
| JP | 2007-122560 A | 5/2007 |
| JP | 2008-176698 A | 7/2008 |
| WO | 2011/039846 A1 | 4/2011 |

* cited by examiner

RANDOM NUMBER GENERATING DEVICE

This is a continuation application under 35 U.S.C 111(a) of pending prior International Application No. PCT/JP2012/000870, filed on Feb. 9, 2012.

BACKGROUND OF THE INVENTION

1. Field of the Invention

The present invention relates to random number generating devices.

2. Description of the Related Art

It is known that random numbers are used as the ID (identification number) of a communication device such as an IC card or a contactless communication device. In such a case where random numbers are used as an ID, the random numbers are required to be highly irregular. In order to meet such a requirement, there is a known technique in which a stabilized power supply for supplying a constant output voltage to a load circuit is used, such that random numbers are generated by using a control signal that is generated by amplifying a variation of the output voltage from a reference voltage (e.g., Japanese Laid-Open Patent Application Publication No. 2007-122560).

FIG. 17 is a circuit diagram showing a configuration of a conventional random number generating device. As shown in FIG. 17, such a random number generating device as disclosed in Japanese Laid-Open Patent Application Publication No. 2007-122560 includes: a regulator 900; a voltage controlled oscillator (VCO) 930; and a random number generator 940. In order to supply a constant output voltage Vout as power supply for a load circuit 920, the regulator 900 amplifies a difference between a reference voltage Vref and a feedback voltage S93 by means of an amplifier 91, thereby generating a control voltage S91. Based on the control voltage S91, the output voltage Vout is adjusted. The VCO 930 outputs an output signal CLK whose oscillation frequency has been varied in accordance with variation in the voltage level of the control voltage S91. The random number generator 940 generates pseudorandom numbers based on the output signal CLK from the VCO 930. Accordingly, the pseudorandom numbers generated by the random number generator 940 vary in accordance with the oscillation frequency of the VCO 930 (i.e., vary in accordance with the control voltage S91 of the regulator 900). Therefore, the random number generator 940 can generate highly irregular random numbers, so long as the control voltage S91 varies constantly.

Also, Japanese Laid-Open Patent Application Publication No. H10-340183 discloses a configuration for generating pseudorandom numbers varying in accordance with variation in the voltage level of a control voltage inputted to a control terminal of a VCO.

SUMMARY OF THE INVENTION

However, in order for such random number generating devices as described above to obtain highly irregular random numbers, the variation in the control voltage inputted to the VOC needs to be great.

Japanese Laid-Open Patent Application Publication No. 2007-122560 discloses the technique on the assumption that the control voltage varies in accordance with a load increase/decrease and a variation in power supply voltage. If the amount of load increase/decrease is small and the power supply voltage is stable, then there is almost no variation in the control voltage. If the variation in the control voltage is small, then the variation in the oscillation frequency of the output voltage from the VCO is small, and as a result, the irregularity of the random numbers is reduced. Japanese Laid-Open Patent Application Publication No. H10-340183 discloses using a power supply with large voltage variation to supply the control voltage to the VCO, but discloses no specific configuration of the power supply.

The present invention solves the above conventional problems. An object of the present invention is to provide a random number generating device capable of generating highly irregular random numbers with a simple configuration.

A random number generating device according to one aspect of the present invention includes: a receiving unit including a receiving mechanism configured to receive, in a contactless manner, energy transmitted from a transmitting unit, the receiving unit being configured to convert the energy received by the receiving mechanism into a reception voltage; a voltage controlled oscillator configured to output an oscillating output signal based on the reception voltage; and a pseudorandom number generator configured to generate pseudorandom numbers varying in accordance with an oscillation frequency of the output signal from the voltage controlled oscillator. The voltage controlled oscillator is configured to make, based on an operation signal, a switch between an ON period in which the voltage controlled oscillator outputs the output signal based on the reception voltage and an OFF period in which the voltage controlled oscillator outputs the output signal with a predetermined fixed voltage level. The pseudorandom number generator is configured to generate pseudorandom numbers varying based on a wavenumber of the output signal that is inputted to the pseudorandom number generator during the ON period.

According to the above configuration, the oscillation frequency of the output signal outputted from the voltage controlled oscillator varies in accordance with the reception voltage of the receiving unit which receives, in a contactless manner, the energy transmitted from the transmitting unit. Since the reception voltage varies in accordance with a distance between the transmitting unit and the receiving unit, the reception voltage can be varied greatly by changing the distance. Since pseudorandom numbers can be generated based on the reception voltage varying greatly in such a manner, highly irregular random numbers can be generated with a simple configuration. Further, since a period in which reception voltage variation is great can be set as the ON period, pseudorandom numbers can be generated based on the period in which the reception voltage variation is great. This consequently makes it possible to further increase the irregularity of the random numbers.

The random number generating device may further include a limiter circuit configured to limit the reception voltage of the receiving unit to be in a predetermined voltage range. This makes it possible to limit a voltage inputted to the voltage controlled oscillator (i.e., a voltage based on the reception voltage) to be in the operating voltage range of the voltage controlled oscillator.

The limiter circuit may have such a temperature-dependent property that an output voltage value varies depending on a temperature. Accordingly, the voltage inputted to the voltage controlled oscillator varies also in accordance with temperature changes. This makes it possible to generate random numbers with higher irregularity.

The receiving mechanism may include a coil configured to receive an electromagnetic wave from the transmitting unit in a contactless manner. Accordingly, induced electromotive force generated at the coil varies easily in accordance with the distance between the transmitting unit and the receiving unit.

In addition, the induced electromotive force generated at the coil can be readily used as power supply for the receiving unit.

The receiving mechanism may include a photodetector configured to receive light from the transmitting unit in a contactless manner. Accordingly, the amount of light received by the photodetector easily varies in accordance with the distance between the transmitting unit and the receiving unit.

The pseudorandom number generator may include an M-sequence bit string operating unit including a shift register and an exclusive OR gate. This makes it possible to readily generate a complex pseudorandom number sequence with a simple configuration.

A random number generating device according to another aspect of the present invention includes: a receiving unit configured to convert energy applied to a receiving mechanism into a reception voltage, the receiving mechanism being configured to receive, in a contactless manner, energy transmitted from a transmitting unit; a voltage controlled oscillator configured to output an oscillating output signal based on the reception voltage; and a pseudorandom number generator configured to generate pseudorandom numbers varying in accordance with an oscillation frequency of the output signal from the voltage controlled oscillator. The voltage controlled oscillator is configured to make a switch between an ON period in which the voltage controlled oscillator outputs the output signal based on the reception voltage and an OFF period in which the voltage controlled oscillator outputs a predetermined voltage level. The pseudorandom number generator is configured to generate pseudorandom numbers varying based on a wavenumber of the output signal that is inputted to the pseudorandom number generator during the ON period.

A method of generating random numbers according to yet another aspect of the present invention includes: a receiving step of receiving, in a contactless manner, energy transmitted from a transmitting unit; a voltage converting step of converting the received energy into a reception voltage; a voltage-controlled oscillating step of outputting an oscillating output signal based on the reception voltage; and a pseudorandom number generating step of generating pseudorandom numbers varying in accordance with an oscillation frequency of the output signal outputted in the voltage-controlled oscillating step. In the voltage-controlled oscillating step, a switch is made between an ON period in which the output signal is outputted based on the reception voltage and an OFF period in which a predetermined voltage level is outputted. The pseudorandom number generating step is a step of generating pseudorandom numbers varying based on a wavenumber of the output signal that is outputted during the ON period.

The above and further objects, features, and advantages of the present invention will more fully be apparent from the following detailed description with accompanying drawings.

The present invention is configured as described above, and provides an advantageous effect of being able to generate highly irregular random numbers with a simple configuration.

DESCRIPTION OF THE PREFERRED EMBODIMENTS

Figure 1:
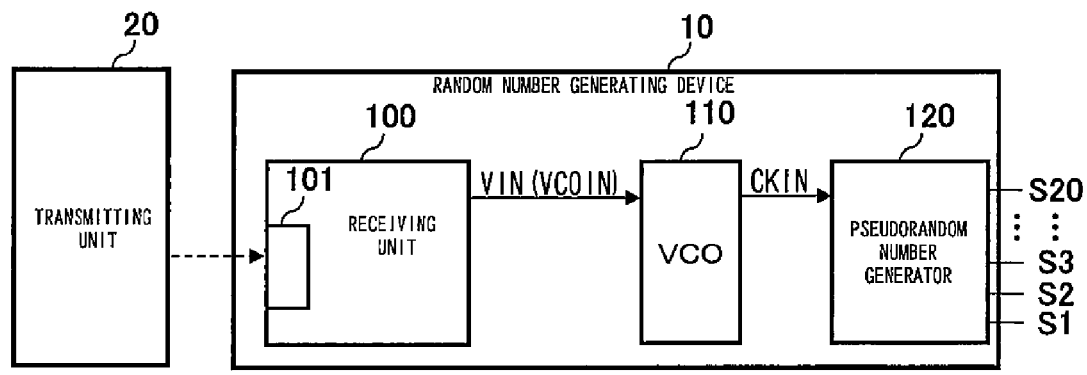
FIG. 1 is a circuit diagram showing an example of a schematic configuration of a random number generating device according to Embodiment 1 of the present invention.

Hereinafter, embodiments of the present invention are described with reference to the drawings. In the drawings, the same or corresponding elements are denoted by the same reference signs, and a repetition of the same description is avoided.

<Embodiment 1>

First, a random number generating device according to Embodiment 1 of the present invention is described. FIG. 1 is a circuit diagram showing an example of a schematic configuration of the random number generating device according to Embodiment 1 of the present invention.

As shown in FIG. 1, a random number generating device 10 according to the present embodiment includes: a receiving unit 100 including a receiving mechanism 101 configured to receive, in a contactless manner, energy transmitted from a transmitting unit 20, the receiving unit 100 being configured to convert the energy received by the receiving mechanism 101 into a reception voltage VIN; a voltage controlled oscillator (VCO) 110 configured to output an oscillating output signal CKIN based on the reception voltage VIN; and a pseudorandom number generator 120 configured to generate pseudorandom numbers varying in accordance with the oscillation frequency of the output signal CKIN from the voltage controlled oscillator 110.

When energy is transmitted from the transmitting unit 20 to the receiving unit 100 in a contactless manner, the receiving unit 100 receives the energy by the receiving mechanism 101, and converts the energy into a reception voltage VIN. A control voltage VCOIN based on the reception voltage VIN is inputted to the voltage controlled oscillator 110. It should be noted that, in the present embodiment, the control voltage VCOIN is equal to the reception voltage VIN. The voltage controlled oscillator 110 outputs an output signal (clock signal) CKIN which oscillates based on the inputted control voltage VCOIN. The pseudorandom number generator 120 generates a pseudorandom number sequence varying in accordance with the output signal CKIN from the voltage controlled oscillator 110, and outputs the pseudorandom numbers of the pseudorandom number sequence in a bit-by-bit manner. In the present embodiment, the pseudorandom number generator 120 includes 20 output terminals S1 to S20, and generates a pseudorandom number sequence of 20-bit pseudorandom numbers.

According to the above configuration, the oscillation frequency of the output signal CKIN outputted from the voltage controlled oscillator 110 varies in accordance with the reception voltage VIN of the receiving unit 100 which receives, in a contactless manner, the energy transmitted from the transmitting unit 20. Since the reception voltage VIN varies in accordance with a distance between the transmitting unit 20 and the receiving unit 100, the reception voltage VIN can be varied greatly by changing the distance. Since pseudorandom numbers can be generated based on the reception voltage VIN varying greatly in such a manner, highly irregular random numbers can be generated with a simple configuration.

Figure 2:
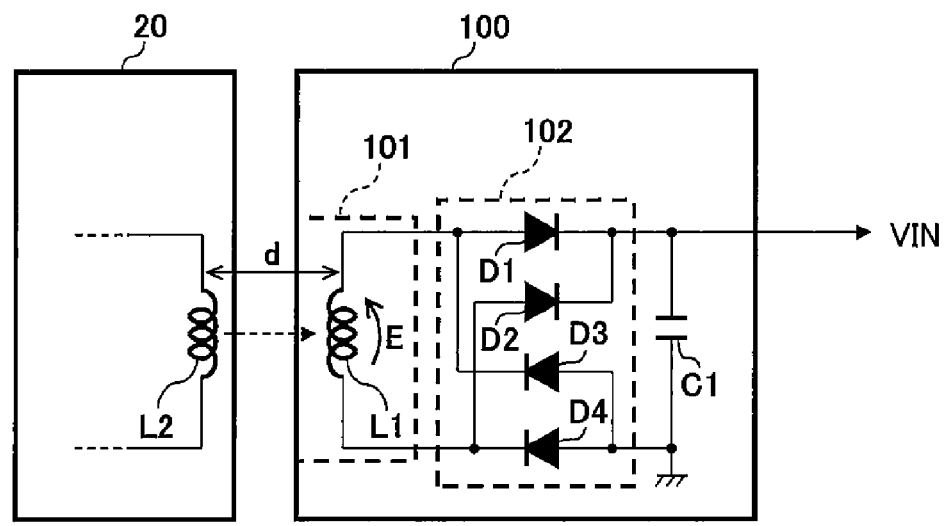
FIG. 2 is a circuit diagram showing a specific example of a configuration of a receiving unit in the random number generating device shown in FIG. 1.

FIG. 2 is a circuit diagram showing a specific example of a configuration of the receiving unit in the random number generating device shown in FIG. 1. As shown in FIG. 2, the transmitting unit 20 according to the present embodiment includes a coil (primary-side coil) L2, to which a voltage based on electric power supplied from a power supply (not shown) is applied. Correspondingly, the receiving unit 100 according to the present embodiment includes, as the receiving mechanism 101, a coil (secondary-side coil) L1 configured to receive, in a contactless manner, an electromagnetic wave as energy from the transmitting unit 20. With this configuration, the energy can be sent and received between the coil L2 of the transmitting unit 20 and the coil L1 of the receiving unit 100 by electromagnetic induction. Accordingly, induced electromotive force E is generated at the coil L1 of the receiving unit 100 when the energy is transmitted in a contactless manner by an electromagnetic wave from the coil L2 of the transmitting unit 20 to the coil L1 of the receiving unit 100. Since the induced electromotive force E is generated at the coil L1 of the receiving unit 100 in a contactless manner as described above, the induced electromotive force E generated at the coil L1 easily varies in accordance with the distance between the transmitting unit 20 and the receiving unit 100. As a result, the reception voltage VIN varies easily. In addition, the induced electromotive force E generated at the coil L1 can be readily used as power supply for the random number generating device 10.

The receiving unit 100 further includes a rectifier circuit 102 configured to rectify the induced electromotive force E received by the coil L1 of the receiving mechanism 101. To be specific, the rectifier circuit 102 is configured as a diode bridge circuit in which four diodes D1 to D4 are bridge-connected. The anode of the diode D1 and the cathode of the diode D3 are connected to one end of the coil L1. The anode of the diode D2 and the cathode of the diode D4 are connected to the other end of the coil L1. The cathode of the diode D1 and the cathode of the diode D2 are connected to each other, and the anode of the diode D3 and the anode of the diode D4 are connected to each other. The rectifier circuit 102 performs full-wave rectification of the induced electromotive force E received by the coil L1 of the receiving mechanism 101.

The receiving unit 100 further includes a capacitance element C1 for stabilizing the induced electromotive force E rectified by the rectifier circuit 102. The cathodes of the diodes D1 and D2 are connected to one end of the capacitance element C1, and the anodes of the diodes D3 and D4 are connected to the other end of the capacitance element C1. The other end of the capacitance element C1 is connected to the ground, and the voltage of the one end of the capacitance element C1 is outputted as the reception voltage VIN of the receiving unit 100.

Figure 16:
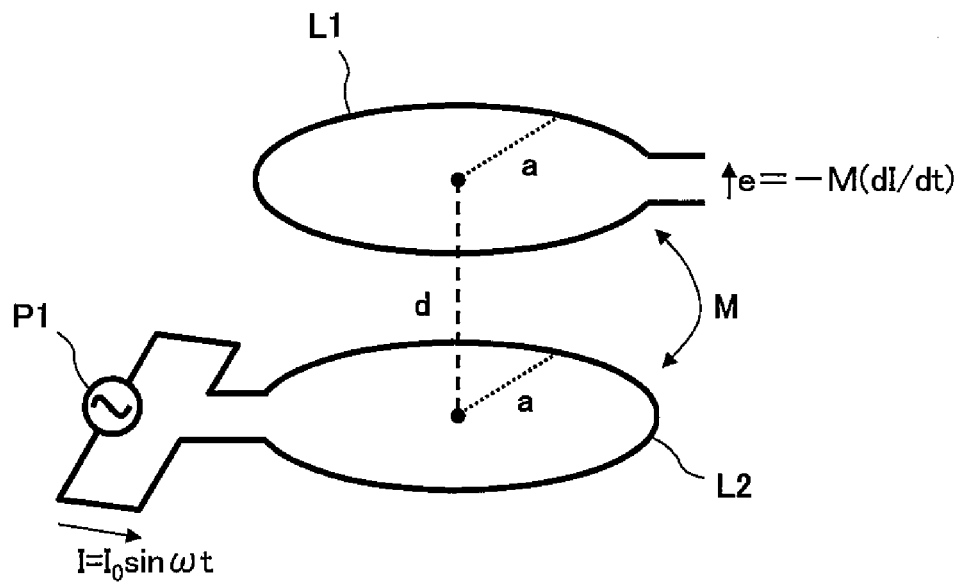
FIG. 16 is a schematic diagram showing an example of a relationship between a primary-side coil and a secondary-side coil.
Figure 17:
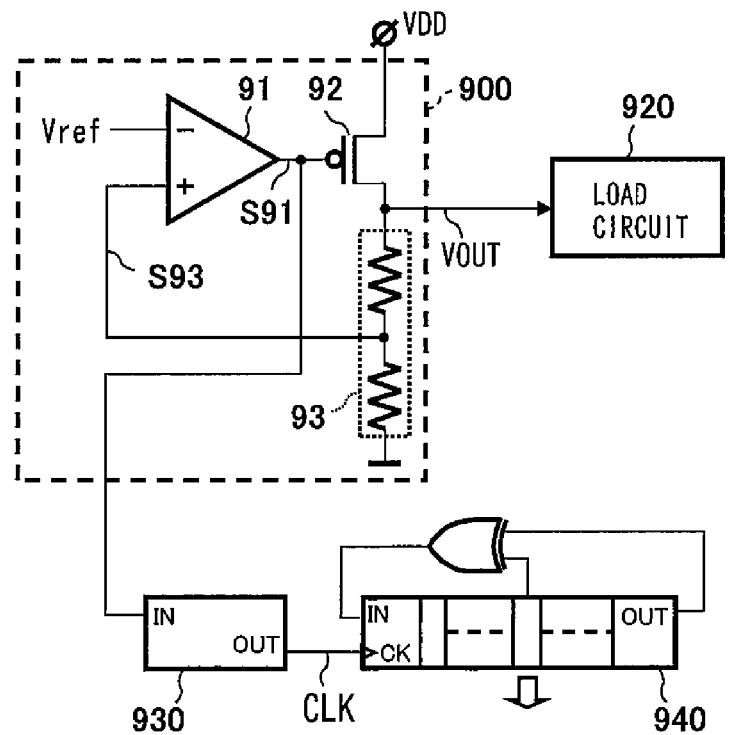
FIG. 17 is a circuit diagram showing a configuration of a conventional random number generating device.

Hereinafter, a relationship between a distance d and the induced electromotive force E generated at the coil L1 of the receiving unit 100 is described. The distance d is the distance between the coil L1 of the receiving unit 100 and the coil L2 of the transmitting unit 20. FIG. 16 is a schematic diagram showing an example of a relationship between the primary-side coil and the secondary-side coil. In the description below, the coil L2 of the transmitting unit 20 is simply referred to as a primary-side coil L2, and the coil L1 of the receiving unit 100 is simply referred to as a secondary-side coil L1. Although the primary-side coil L2 and the secondary-side coil L1 are shown as circular coils in FIG. 16, these coils may have a different shape.

As shown in FIG. 16, the distance between the primary-side coil L2 and the secondary-side coil L1 (i.e., inter-coil distance) is d, and the radius of each of the coils L1 and L2 is a. Here, by using Neumann's formula, a mutual inductance M is represented by $M=\mu_0 a(\log(8a/d)-2)$. It should be noted that $\mu_0$ indicates magnetic permeability in a vacuum. Thus, it is understood that the mutual inductance M varies in accordance with the inter-coil distance d. An alternating current I from an AC power supply P1, which is applied to the primary-side coil L2, can be represented as $I=I_0 \sin \omega t$ by using a maximum value (amplitude) $I_0$ of the current. Here, induced electromotive force e generated at the secondary-side coil L1 is $e=-M(dI/dt)=-MI_0\omega \cos \omega t$. If $e_0=MI_0\omega$, then $e=-e_0 \cos \omega t$.

The root mean square value E of the generated induced electromotive force e is equal to $1/\sqrt{2}$ of the maximum value. Accordingly, $E=e_0/\sqrt{2}=MI_0\omega/\sqrt{2}=(\mu_0 aI_0\omega/\sqrt{2})\cdot(\log(8a/d)-2)$. If $\mu_0 aI_0\omega/\sqrt{2}$, which is a constant, is C, then $E=C(\log(8a/d)-2)$. Thus, it is understood that the root mean square value E of the induced electromotive force e generated at the secondary-side coil L1 varies in accordance with the inter-coil distance d. Accordingly, it is understood that the reception voltage VIN, which is determined based on the root mean square value E of the induced electromotive force e generated at the secondary-side coil L1, also varies in accordance with the distance d between the primary-side coil L2 and the secondary-side coil L1.

Figure 3:
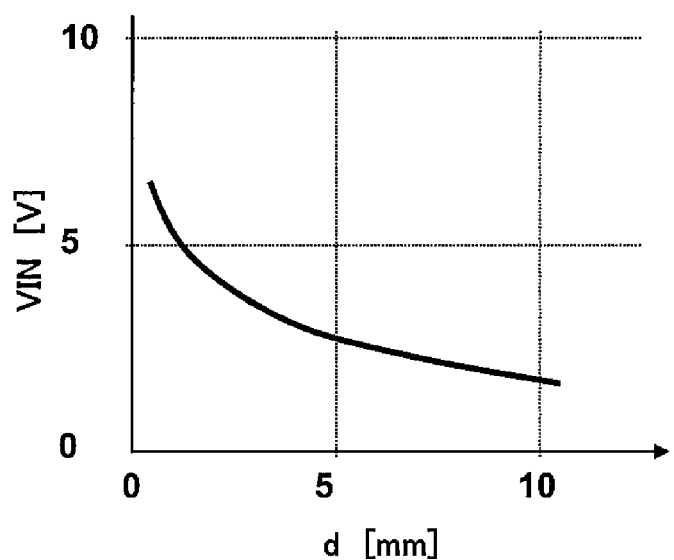
FIG. 3 is a graph showing variation in reception voltage, the variation corresponding to a distance between the receiving unit and a transmitting unit in the random number generating device shown in FIG. 1.

FIG. 3 is a graph showing variation in the reception voltage, the variation corresponding to the distance between the receiving unit and the transmitting unit in the random number generating device shown in FIG. 1. In the example of FIG. 3, the maximum current $I_0$ and frequency f of the alternating current I applied to the primary-side coil L2 from the AC power supply P1 are such that $I_0$=100 mA and f=ω/2π=100 kHz; the winding number N2 of the primary-side coil L2 and the winding number N1 of the secondary-side coil L1 are such that N1=N2=30; and the radius a2 of the primary-side coil L2 and the radius a1 of the secondary-side coil L1 are such that a1=a2=30 mm.

As shown in FIG. 3, the greater the inter-coil distance d (i.e., the more distant the transmitting unit 20 and the receiving unit 100 are from each other), the lower the reception voltage VIN; and the less the inter-coil distance d (i.e., the closer the transmitting unit 20 and the receiving unit 100 are to each other), the higher the reception voltage VIN. Thus, if the distance d between the coil L2 (primary-side coil) of the transmitting unit 20 and the coil L1 (secondary-side coil) of the receiving unit 100 changes, then the mutual inductance M changes, which causes the magnitude of the induced electromotive force e to vary greatly. As a result, the reception voltage VIN also varies greatly. Therefore, highly irregular random numbers can be generated by generating pseudorandom numbers based on the reception voltage VIN which varies greatly in accordance with the distance between the transmitting unit 20 and the receiving unit 100.

The voltage controlled oscillator 110 is not limited to a particular type of oscillator. As one example, a voltage controlled ring oscillator is applicable. The voltage controlled oscillator 110 of a ring oscillator type, which is not shown, includes: a voltage-to-current converter circuit to which a control signal VCOIN based on the reception voltage VIN is inputted, the voltage-to-current converter circuit being configured to convert the voltage level of the control signal VCOIN into a current; and an inverter chain circuit configured to set the frequency clock of the output signal CKIN based on the converted current value. The inverter chain circuit is configured by sequentially connecting a plurality of inverters. The output signal CKIN is outputted such that the greater the converted current value, the less the delay (the higher the frequency of the output signal CKIN), and such that the less the converted current value, the greater the delay (the lower the frequency of the output signal CKIN).

Figure 4:
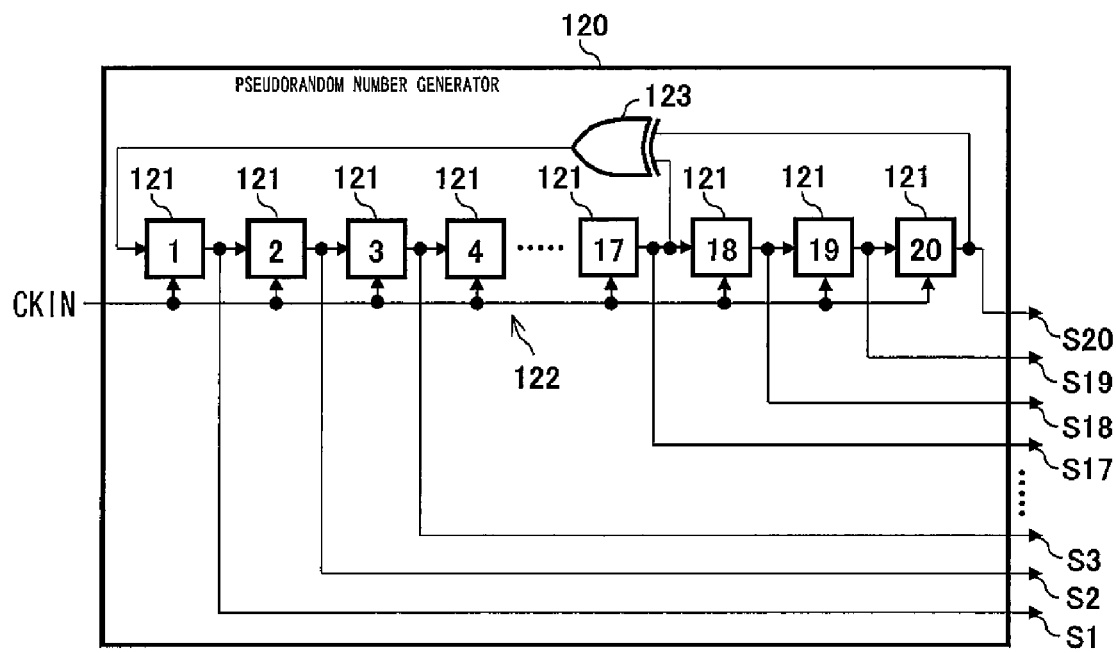
FIG. 4 is a circuit diagram showing a specific example of a configuration of a pseudorandom number generator in the random number generating device shown in FIG. 1.

FIG. 4 is a circuit diagram showing a specific example of a configuration of the pseudorandom number generator in the random number generating device shown in FIG. 1. As shown in FIG. 4, the pseudorandom number generator 120 according to the present embodiment includes an M-sequence bit string operating unit. The M-sequence bit string operating unit includes a shift register 122 and an exclusive OR (XOR) gate 123. In the present embodiment, the shift register 122 is configured such that multiple (20 in the example of FIG. 4) registers 121 are sequentially connected to each other, and thereby the shift register includes multiple-bit (20 bits in the example of FIG. 4) outputs.

For example, each register 121 is configured as a D flip-flop circuit. The output signal CKIN from the voltage controlled oscillator 110 is inputted to a clock input terminal of each register 121. An output signal from the XOR gate 123 is inputted to an input terminal of the register 121 at the first stage. Each of the input terminals of the respective registers 121 at the other stages receives an output signal from the register 121 at the immediately preceding stage. Accordingly, each time the clock pulse of the output signal CKIN from the voltage controlled oscillator 110 is inputted, each register 121 receives a signal level (either L level or H level higher than L level) through its input terminal and then outputs the signal level to the register 121 at the immediately subsequent stage. Outputs from the respective registers 121 are outputted from the output terminals S1 to S20 of the pseudorandom number generator 120, and 20-bit pseudorandom numbers varying in accordance with the wavenumber (clock pulse number) of the output signal CKIN from the voltage controlled oscillator 110 are generated.

The output signal from the register 121 at a predetermined stage (17th stage in the example of FIG. 4) and the output signal from the register 121 at the final stage (20th stage in the example of FIG. 4) are inputted to an input terminal of the XOR gate 123.

It should be noted that the registers 121 connected to the input terminal of the XOR gate 123 are set as described below. Specifically, an M-sequence bit string applied to the pseudorandom number generator 120 in the present embodiment is a bit sequence represented by a linear recurrence formula shown below.

$X_n = (X_{n-p}) \text{XOR} (X_{n-q})$, wherein $p > q > 0$.

The cycle of the M-sequence bit string shown above is represented by $2^p - 1$. In the example of FIG. 4, p=20 and q=17. Accordingly, the cycle is $2^{20} - 1 = 1048575$. The values of p and q can be suitably set as necessary. Accordingly, the registers 121 to be connected to the input terminal of the XOR gate 123 may be changed in accordance with the set values.

Here, the wavenumber (clock pulse number), in a predetermined period, of the output signal CKIN outputted from the voltage controlled oscillator 110 and inputted to the shift register 122 of the pseudorandom number generator 120 varies when the induced electromotive force generated at the coil L1 easily varies in accordance with the distance between the transmitting unit 20 and the receiving unit 100.

Thus, in the random number generating device 10 according to the present embodiment, even if a period in which the output signal CKIN is inputted to the pseudorandom number generator 120 is fixed, the wavenumber of the output signal CKIN inputted to the pseudorandom number generator 120 varies. As a result, pseudorandom numbers generated by the pseudorandom number generator 120 vary greatly, which makes it possible to output highly irregular random numbers. The period in which the output signal CKIN is inputted to the pseudorandom number generator 120 may be determined, as described below, based on whether or not to cause the voltage controlled oscillator 110 to operate. Alternatively, an output terminal of the voltage controlled oscillator 110 may be connected to an input terminal of the pseudorandom number generator 120 only for a predetermined period. Further alternatively, output values outputted from the output terminals S1 to S20 of the pseudorandom number generator 120 at a predetermined timing may be obtained.

Figure 5:
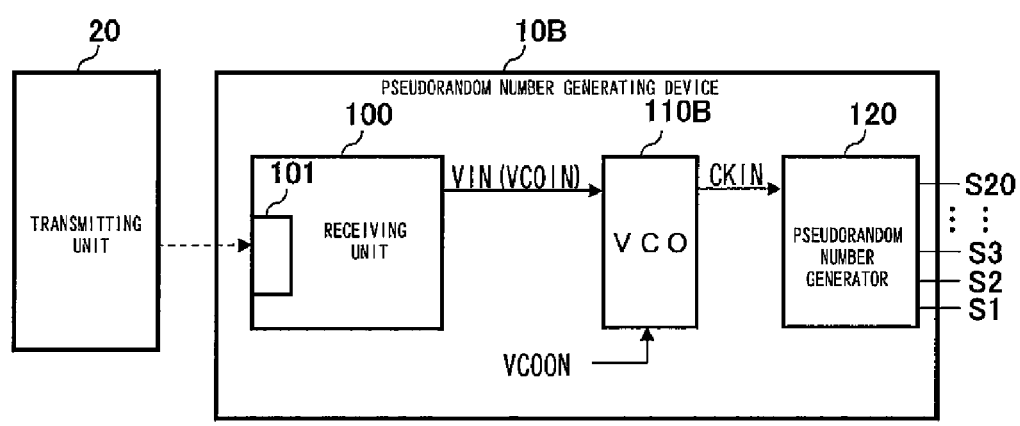
FIG. 5 is a circuit diagram showing an example of a schematic configuration of a random number generating device according to a variation of Embodiment 1 of the present invention.

Hereinafter, one exemplary mode in which the voltage controlled oscillator 110 outputs the output signal CKIN in accordance with a predetermined operation signal is described. FIG. 5 is a circuit diagram showing an example of a schematic configuration of a random number generating device according to a variation of Embodiment 1 of the present invention. In a random number generating device 10B according to the example of FIG. 5, a voltage controlled oscillator 110B is configured to make a switch between an ON period T1 and an OFF period T2 based on an operation signal VCOON. In the ON period T1, the voltage controlled oscillator 110B outputs the output signal CKIN based on the reception voltage VIN. In the OFF period T2, the voltage controlled oscillator 110B outputs the output signal CKIN with a predetermined fixed voltage level. Further, the pseudorandom number generator 120 is configured to generate pseudorandom numbers varying based on the wavenumber of the output signal CKIN that is inputted to the pseudorandom number generator 120 during the ON period T1.

The operation signal VCOON is not limited to any particular type of signal, but may be a signal whose ON period T1 is fixed, or may be a signal whose ON period T1 changes each time. In a case where the operational signal VCOON is a signal whose ON period T1 is fixed, the operation signal VCOON may be, for example, a signal that indicates the ON period T1 from when the reception voltage VIN has become a predetermined first voltage or higher as a result of the transmitting unit 20 approaching the receiving mechanism 101 of the receiving unit 100 to when a predetermined period has elapsed. In a case where the ON period T1 changes each time, the operation signal VCOON may be, for example, a signal that indicates the ON period T1 from when the reception voltage VIN has become the predetermined first voltage or higher to when the reception voltage VIN has become a predetermined second voltage or higher, the second voltage being higher than the first voltage. Such an operation signal VCOON may be generated within the random number generating device 10B, or an externally generated operation signal VCOON may be inputted to the voltage controlled oscillator 110B.

In the above manner, a period in which the reception voltage VIN varies greatly can be set as the ON period T1. Accordingly, pseudorandom numbers can be generated based on the period in which the reception voltage VIN varies greatly. This consequently makes it possible to further increase the irregularity of the random numbers.

Described next is a degree to which the wavenumber of the output signal CKIN from the voltage controlled oscillator 110B varies in accordance with variation in the induced electromotive force E generated in the receiving mechanism 101 of the receiving unit 100 in the above-described random number generating device. It is assumed here that the ON period T1 is fixed (50 ms), and the frequency gain G (described below in detail) of the voltage controlled oscillator 110B is 20 MHz/V.

Figure 9:
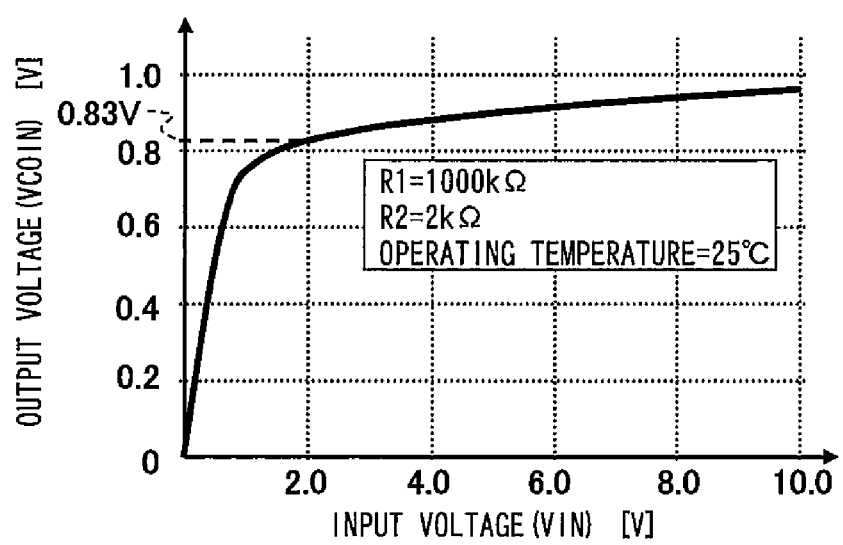
FIG. 9 is a graph showing simulation results of input/output voltage characteristics of the limiter circuit shown in FIG. 8.

If the voltage V1 of the control signal VCOIN inputted to the voltage controlled oscillator 110B is, for example, 0.83 V when the reception voltage VIN=2V as shown in FIG. 9 (a description with reference to FIG. 9 will be given below), then the oscillation frequency f1 of the output signal CKIN is f1=G·V1=16.6 MHz. Accordingly, the wavenumber (clock pulse number) n1 of the oscillation frequency f1 in the ON period T1 is n1=T1/(1/f1)=830000. Here, if the voltage of the control signal VCOIN inputted to the voltage controlled oscillator 110B has changed from V1 by 1 mV (V2=V1+0.001 V=0.831 V), then the oscillation frequency f2 of the output signal CKIN is f2=G·V2=16.62 MHz. Accordingly, the wavenumber n2 of the oscillation frequency f2 in the ON period T1 is n2=T1/(1/f2)=831000.

Based the above, if the voltage of the control signal VCOIN has changed by 1 mV, the difference between wavenumbers inputted to the pseudorandom number generator 120 is n2−n1=1000 (≥1). If the wavenumbers are different from each other by 1 or more, of course the pseudorandom numbers to be generated vary. As a result, random numbers to be outputted become irregular. Thus, even though the ON period T1 is fixed, the wavenumber of the output signal CKIN inputted to the pseudorandom number generator 120 varies each time the operation signal VCOON indicates the ON period T1. This makes it possible to readily generate irregular random numbers with a simple configuration.

It should be noted that when the operation signal VCOON indicates the OFF period T2, the voltage level of the output signal CKIN inputted to the pseudorandom number generator 120 becomes a predetermined voltage level (L level which does not cause the pseudorandom number generator 120 to operate) regardless of variation in the control signal VCOIN inputted to the voltage controlled oscillator 110B. Accordingly, in the OFF period T2, outputs from the respective output terminals S1 to S20 of the pseudorandom number generator 120 are maintained in their state when the ON period T1 has elapsed. Therefore, as described below, even after the operation signal VCOON has changed to indicate the OFF period T2, the generated random numbers can be used for the ID number of a communication device or the like. In addition, in the OFF period T2, the voltage controlled oscillator 110B and the pseudorandom number generator 120 are in a stopped state. Accordingly, electric power can be saved.

<Embodiment 2>

Figure 6:
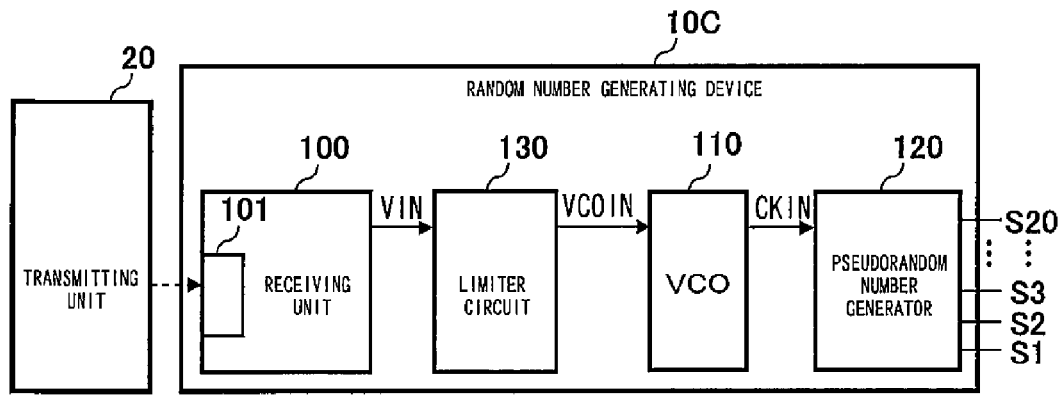
FIG. 6 is a circuit diagram showing an example of a schematic configuration of a random number generating device according to Embodiment 2 of the present invention.

Next, a random number generating device according to Embodiment 2 of the present invention is described. FIG. 6 is a circuit diagram showing an example of a schematic configuration of the random number generating device according to Embodiment 2 of the present invention. In the present embodiment, the same components as those described in Embodiment 1 are denoted by the same reference signs as those used in Embodiment 1, and a description of such components is omitted. A random number generating device 10C according to the present embodiment is different from the random number generating device 10 according to Embodiment 1, in that the random number generating device 10C includes a limiter circuit 130 configured to limit the reception voltage VIN of the receiving unit 100 to be in a predetermined voltage range.

Figure 7:
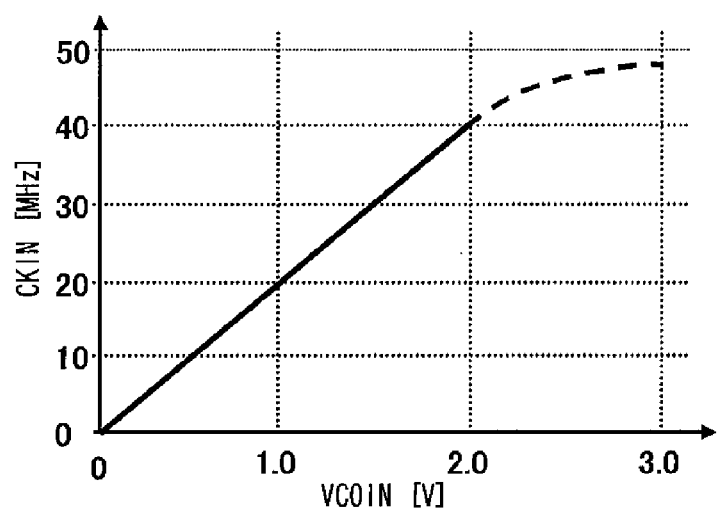
FIG. 7 is a graph showing oscillation frequency characteristics of a voltage controlled oscillator of the random number generating device shown in FIG. 6 in relation to a control voltage.

FIG. 7 is a graph showing oscillation frequency characteristics of the voltage controlled oscillator of the random number generating device shown in FIG. 6 in relation to the control voltage. It is known that, as shown in FIG. 7, the oscillation frequency of the output signal CKIN from the voltage controlled oscillator 110 linearly changes when the control voltage VCOIN is within a certain voltage range. In the example of FIG. 7, the oscillation frequency of the output signal CKIN linearly changes when the control voltage VCOIN is in the range of 0 to 2.0 V. However, when the control voltage VCOIN exceeds 2.0 V, the oscillation frequency becomes close to its upper limit value due to, for example, the circuit characteristics of the voltage controlled oscillator 110, and the increase rate of the oscillation frequency in relation to the increase in the control voltage VCOIN is reduced. For this reason, if a voltage higher than 2.0 V is inputted to the voltage controlled oscillator 110 as the control voltage VCOIN, then the variation in the oscillation frequency of the output signal CKIN from the voltage controlled oscillator 110 is reduced, resulting in reduced irregularity of the pseudorandom numbers, which is unfavorable.

In view of the above, the present embodiment includes a limiter circuit 130 between the voltage controlled oscillator 110 and the receiving unit 100. The limiter circuit 130 limits the reception voltage VIN of the receiving unit 100 to be in a predetermined voltage range (e.g., in the range of 0 to 2.0 V in the example of FIG. 7). Accordingly, the voltage inputted to the voltage controlled oscillator 110 (voltage based on the reception voltage VIN) can be limited to be in the operating voltage range of the voltage controlled oscillator 110 (i.e., in the range of 0 to 2.0 V). It should be noted that, in the example of FIG. 7, a frequency gain (amount of frequency change per V) G in the linear region (in which the control voltage VCOIN is in the range of 0 to 2.0 V) of the voltage controlled oscillator 110 is G=40 MHz/2.0 V=20 (MHz/V).

Figure 8:
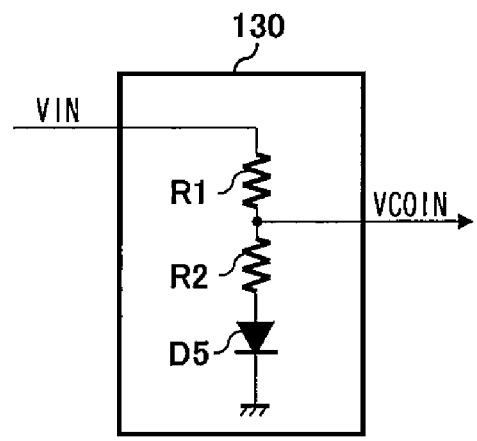
FIG. 8 is a circuit diagram showing a specific example of a configuration of a limiter circuit shown in FIG. 6.

FIG. 8 is a circuit diagram showing a specific example of a configuration of the limiter circuit shown in FIG. 6. As shown in FIG. 8, the limiter circuit 130 according to the present embodiment includes a resistor R1, a resistor R2, and a diode D5, which are connected in series between a predetermined voltage source (in the example of FIG. 8, the ground) and an input terminal to which the input reception voltage VIN is inputted. The anode of the diode D5 is connected to the resistor R2, and the cathode of the diode D5 is connected to the ground. An output terminal is provided between the resistors R1 and R2. The limiter circuit 130 is configured to output a voltage divided by the resistors R1 and R2 as an output voltage (control voltage VCOIN). The voltage division ratio between the resistor R1 and the resistor R2 is set such that the control voltage VCOIN, which is a partial voltage to be outputted, is in the operating voltage range of the voltage controlled oscillator 110.

Hereinafter, the operation of the limiter circuit 130 configured as above is described. If a voltage applied to the diode D5 is lower than a voltage region in which I-V characteristics of the diode D5 vary greatly (the region indicates a so-called ON voltage; for example, approximately 0.6 V in the case of a silicon diode), then the amount of forward current flowing to the diode D5 is significantly small relative to the voltage applied to the diode D5. Therefore, the control voltage VCOIN outputted from the output terminal varies to a relatively great degree in accordance with variation in the reception voltage VIN applied to the input terminal. On the other hand, if the input reception voltage VIN increases and the voltage applied to the diode D5 becomes higher than the ON voltage, then the amount of forward current flowing to the diode D5 becomes significantly large relative to the voltage applied to the diode D5. Therefore, the increase rate of the control voltage VCOIN outputted from the output terminal is reduced compared to the increase rate of the reception voltage VIN applied to the input terminal. Based on the above, the optimal limiter circuit 130 can be readily formed by setting the values of the resistors R1 and R2 such that the voltage applied to the diode D5 becomes the ON voltage when a voltage close to the upper limit value of a desired voltage range is applied to the output terminal.

FIG. 9 is a graph showing simulation results of input/output voltage characteristics of the limiter circuit shown in FIG. 8. FIG. 9 shows the input/output voltage characteristics in a case where, in the limiter circuit 130 shown in FIG. 8, the resistance values of the resistors R1 and R2 are 1000 kΩ and 2 kΩ, respectively, and the standard operating temperature is 25° C. As shown in FIG. 9, even if the input reception voltage VIN exceeds 2.0 V, the control voltage can be set to be in a range that does not exceed the operating voltage range of the voltage controlled oscillator 110 since an increase in the output control voltage VCOIN is suppressed when the input reception voltage VIN exceeds 2.0 V.

It should be noted that, in the present embodiment, the limiter circuit 130 is configured by using the diode D5. However, the limiter circuit 130 may be configured not by using the diode D5 but by using a different rectifier, so long as the rectifier has nonlinear I-V characteristics. For example, instead of the diode D5, the limiter circuit 130 may be configured by using a Schottky bather diode or a Zener diode. In the case of using a Schottky bather diode, the Schottky bather diode is, similar to the diode D5, connected such that a direction from the resistor R2 toward the predetermined voltage source is a forward direction. In the case of using a Zener diode, the Zener diode is connected such that a direction from the predetermined voltage source toward the resistor R2 is a forward direction.

Figure 10:
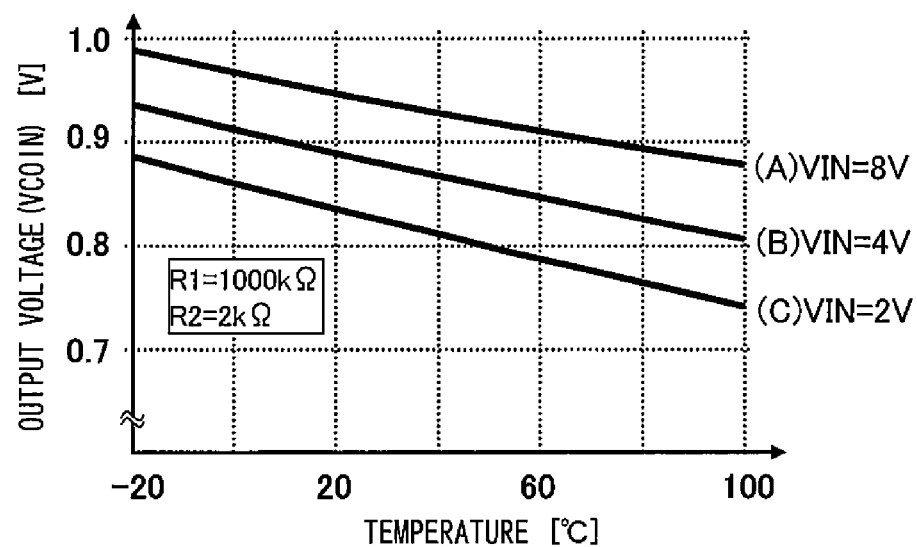
FIG. 10 is a graph showing simulation results of output voltage characteristics of the limiter circuit shown in FIG. 8 in relation to a temperature.

Moreover, the limiter circuit 130 as described above may have such a temperature-dependent property that an output voltage value varies depending on a temperature. FIG. 10 is a graph showing simulation results of output voltage characteristics of the limiter circuit shown in FIG. 8 in relation to a temperature. FIG. 10 shows variation in the output control voltage VCOIN when the operating temperature of the limiter circuit 130 shown in FIG. 8 is changed within the range of −20° C. to 100° C. under the following conditions: the resistance values of the resistors R1 and R2 of the limiter circuit 130 are 1000 kΩ and 2 kΩ, respectively; and input reception voltages VIN are (A)VIN=8V, (B)VIN=4V, and (C)VIN=2V.

As shown in FIG. 10, even if the input reception voltage VIN is the same, the output control voltage VCOIN varies in accordance with changes in the temperature. In the example of FIG. 10, the control voltage VCOIN decreases in accordance with an increase in the temperature. That is, in the example of FIG. 10, the overall limiter circuit 130 has a negative temperature coefficient. It should be noted that, as an alternative, the limiter circuit may be configured such that the overall limiter circuit has a positive temperature coefficient. The temperature-dependent property as described above is based on the temperature characteristics of the resistors R1, R2 and diode D5 forming the limiter circuit 130. A desirable temperature-dependent property can be obtained by combining the temperature characteristics of the respective components such that desirable temperature characteristics are obtained by the overall limiter circuit 130. As a result, random numbers with higher irregularity can be generated since the voltage inputted to the voltage controlled oscillator 110 (control voltage VCOIN) varies also in accordance with temperature changes.

<Variation of Embodiment 2>

Figure 11:
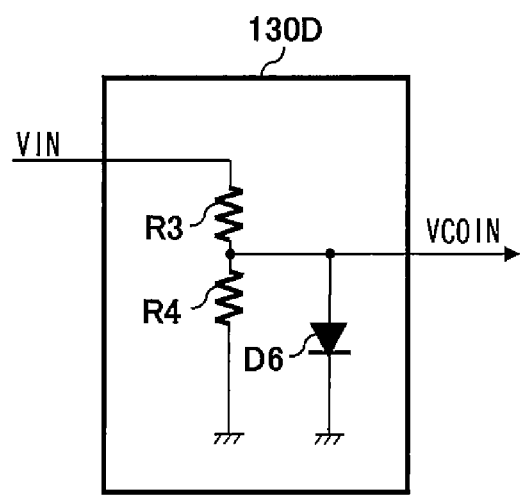
FIG. 11 is a circuit diagram showing an example of a schematic configuration of a random number generating device according to a variation of Embodiment 2 of the present invention.

Next, a random number generating device according to a variation of Embodiment 2 of the present invention is described. FIG. 11 is a circuit diagram showing an example of a schematic configuration of the random number generating device according to the variation of Embodiment 2 of the present invention. In the present variation, the same components as those described in Embodiment 2 are denoted by the same reference signs as those used in Embodiment 2, and a description of such components is omitted. The random number generating device according to the present variation (FIG. 11 does not show the entire random number generating device) is different from Embodiment 2, in that the configuration of a limiter circuit 130D according to the present variation is different from the configuration of the limiter circuit 130 according to Embodiment 2. Specifically, as shown in FIG. 11, the limiter circuit 130D includes: a resistor R3 and a resistor R4 which are connected in series between an input terminal and a predetermined voltage source (in the example of FIG. 11, the ground); and a diode D6 whose anode is connected between the resistor R3 and the resistor R4 and whose cathode is connected to the predetermined voltage source (in the example of FIG. 11, the ground). An output terminal is connected between the resistor R3 and the resistor R4.

According to the above configuration, the reception voltage VIN applied to the input terminal is divided by the resistors R3 and R4, and a resultant partial voltage is applied to the diode D6. The voltage applied to the diode D6 is the control voltage VCOIN outputted from the output terminal. If the voltage applied to the diode D6 is lower than the ON voltage of the diode D6, then the amount of forward current flowing to the diode D6 is significantly small relative to the voltage applied to the diode D6. Therefore, the control voltage VCOIN outputted from the output terminal varies to a relatively great degree in accordance with variation in the reception voltage VIN applied to the input terminal. On the other hand, if the input reception voltage VIN increases and the voltage applied to the diode D6 becomes higher than the ON voltage, then the amount of forward current flowing to the diode D6 becomes significantly large relative to the voltage applied to the diode D6. Therefore, the increase rate of the control voltage VCOIN outputted from the output terminal is reduced compared to the increase rate of the reception voltage VIN applied to the input terminal. Based on the above, the optimal limiter circuit 130D can be readily formed by setting the values of the resistors R3 and R4 such that the voltage applied to the diode D6 becomes the ON voltage when a voltage close to the upper limit value of a desired voltage range is applied to the output terminal.

Figure 12:
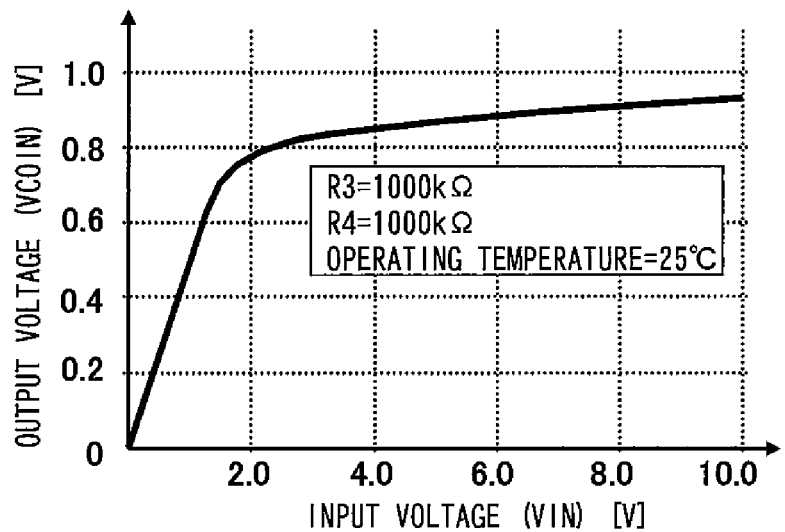
FIG. 12 is a graph showing simulation results of input/output voltage characteristics of a limiter circuit shown in FIG. 11.

FIG. 12 is a graph showing simulation results of input/output voltage characteristics of the limiter circuit shown in FIG. 11. FIG. 12 shows the input/output voltage characteristics in a case where, in the limiter circuit 130D shown in FIG. 11, the resistance values of the resistors R3 and R4 are both 1000 kΩ and the standard operating temperature is 25° C. As shown in FIG. 12, also in the present variation, even if the input reception voltage VIN exceeds 2.0 V, the control voltage VCOIN can be set to be in a range that does not exceed the operating voltage range of the voltage controlled oscillator 110 since an increase in the output control voltage VCOIN is suppressed when the input reception voltage VIN exceeds 2.0 V.

It should be noted that, also in the present variation, a Schottky barrier diode or a Zener diode may be used instead of the diode D6.

Figure 13:
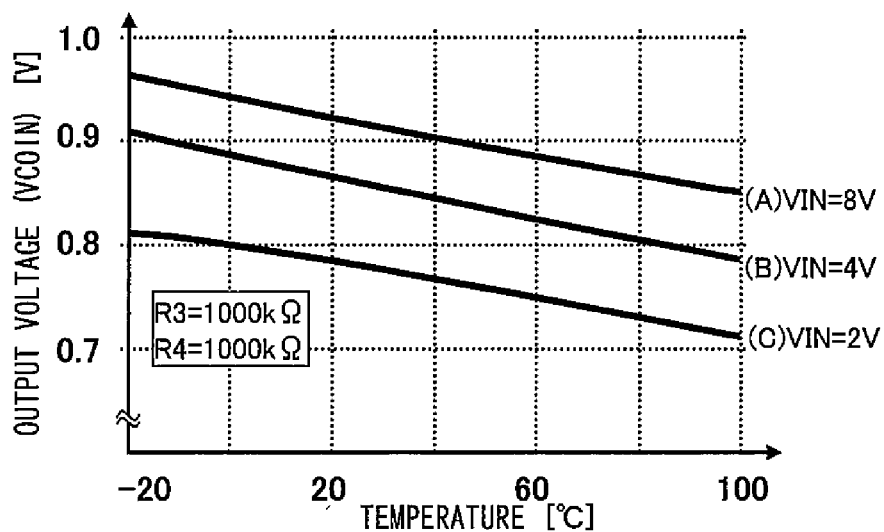
FIG. 13 is a graph showing simulation results of output voltage characteristics of the limiter circuit shown in FIG. 11 in relation to a temperature.

The limiter circuit 130D according to the present variation may also be configured to have a temperature-dependent property. FIG. 13 is a graph showing simulation results of output voltage characteristics of the limiter circuit shown in FIG. 11 in relation to a temperature. FIG. 13 shows variation in the output control voltage VCOIN when the operating temperature of the limiter circuit 130D shown in FIG. 11 is changed within the range of −20° C. to 100° C. under the following conditions: the resistance values of the resistors R3 and R4 of the limiter circuit 130D are both 1000 kΩ; and input reception voltages VIN are (A)VIN=8V, (B)VIN=4V, and (C)VIN=2V.

Also in the present variation, as shown in FIG. 13, even if the input reception voltage VIN is the same, the output control voltage VCOIN varies in accordance with changes in the temperature. As a result, random numbers with higher irregularity can be generated since the voltage inputted to the voltage controlled oscillator 110 (control voltage VCOIN) varies also in accordance with temperature changes.

<Embodiment 3>

Figure 14:
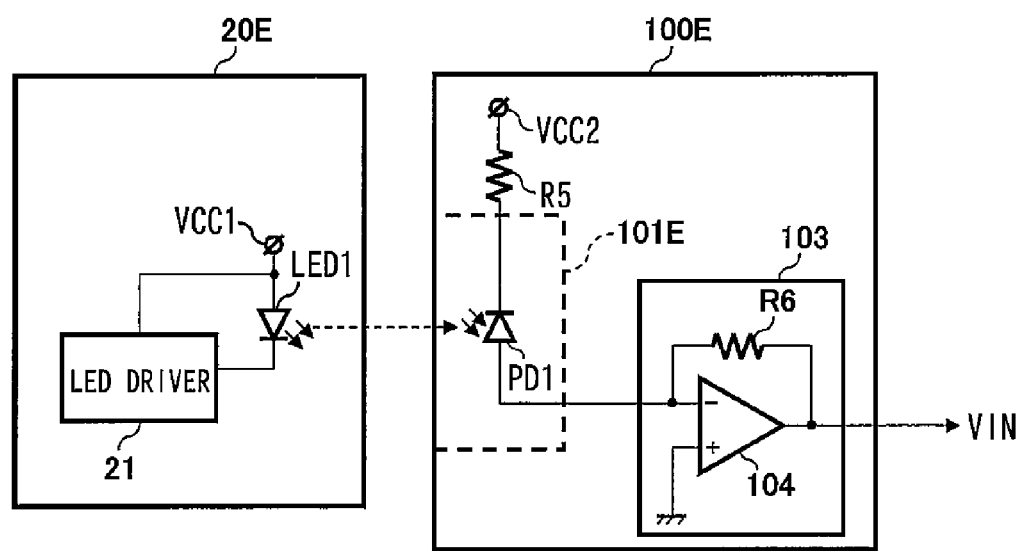
FIG. 14 is a circuit diagram showing an example of a schematic configuration of a receiving unit in a random number generating device according to Embodiment 3 of the present invention.

Next, a random number generating device according to Embodiment 3 of the present invention is described. FIG. 14 is a circuit diagram showing an example of a schematic configuration of a receiving unit in the random number generating device according to Embodiment 3 of the present invention. In the present embodiment, the same components as those described in Embodiment 1 are denoted by the same reference signs as those used in Embodiment 1, and a description of such components is omitted. The random number generating device according to the present embodiment is different from Embodiment 1, in that a receiving mechanism 101E of a receiving unit 100E according to Embodiment 3 includes a photodetector PD1 configured to receive light as energy from a transmitting unit 20E in a contactless manner. Except for the receiving unit 100E, the random number generating device according to the present embodiment is the same as Embodiment 1. Therefore, the other components are not shown in FIG. 14.

In the present embodiment, the transmitting unit 20E includes: a primary-side power supply VCC1; a light-emitting diode LED1 configured to emit light by using electric power from the primary-side power supply VCC1; and an LED driver 21 configured to drive the light-emitting diode LED1. The photodetector PD1 of the receiving unit 100E is configured to receive energy originating from the light emission by the light-emitting diode LED1 of the transmitting unit 20E. The photodetector PD1 is configured as a photodiode, for example. The receiving unit 100E includes: a secondary-side power supply VCC2 for applying a reverse bias to the photodetector PD1; a protective resistor R5; and a current-to-voltage converter circuit 103 configured to convert a current detected by the photodetector PD1 into a voltage and output the reception voltage VIN. The cathode of the photodetector PD1 is connected to the protective resistor R5 (i.e., connected to the secondary-side power supply VCC2 side), and the anode of the photodetector PD1 is connected to the current-to-voltage converter circuit 103.

The current-to-voltage converter circuit 103 includes: an operational amplifier 104 including an inverting input terminal to which a current detected by the photodetector PD1 is inputted and a non-inverting input terminal to which the ground is connected; and a feedback resistor R6 provided on a feedback path between the inverting input terminal and an output terminal of the operational amplifier 104.

In the above configuration, if light from the light-emitting diode LED1 of the transmitting unit 20E is incident on the photodetector PD1 in a state where a reverse bias is applied to the photodetector PD1 by the secondary-side power supply VCC2, then a photocurrent in a reverse direction flows through the photodetector PD1. The photocurrent flowing through the photodetector PD1 varies in accordance with the sensitivity of the photodetector PD1 to the received light. The emission intensity of the light-emitting diode LED1 of the transmitting unit 20E varies in accordance with a control command from the LED driver 21. In accordance with the variation in the emission intensity of the light-emitting diode LED1, the amount of light received by the photodetector PD1 of the receiving unit 100E varies. Even if the emission intensity of the light-emitting diode LED1 is the same, the amount of light received by the photodetector PD1 easily varies in accordance with a distance between the transmitting unit 20E and the receiving unit 100E. As described above, the photocurrent flowing through the photodetector PD1 varies in accordance with the amount of light received by the photodetector PD1. The photocurrent flowing through the photodetector PD1 is inputted to the non-inverting input terminal of the operational amplifier 104. There is an imaginary short-circuit state between the non-inverting input terminal and the inverting input terminal of the operational amplifier 104. Therefore, the voltage VIN outputted from the output terminal of the operational amplifier 104 (i.e., reception voltage VIN) has a value that is obtained by multiplying the value of the current inputted to the non-inverting input terminal by the resistance value of the feedback resistor R6. Based on the above, the configuration as described in the present embodiment makes it possible to obtain the reception voltage VIN that varies greatly in accordance with the distance between the transmitting unit 20E and the receiving unit 100E. Accordingly, also in the present embodiment, pseudorandom numbers can be generated based on the reception voltage VIN that varies greatly. Thus, highly irregular random numbers can be generated with a simple configuration.

It should be noted that, in the present embodiment, the components forming the receiving unit 100E may be configured to have a temperature-dependent property. Alternatively, similar to Embodiment 2, a limiter circuit having a temperature-dependent property may be included. As a result, random numbers with higher irregularity can be generated since the voltage inputted to the voltage controlled oscillator 110 (control voltage VCOIN) varies also in accordance with temperature changes.

The present embodiment describes, as an example, a configuration of the current-to-voltage converter circuit 103, which includes the operational amplifier 104. However, the present embodiment is not thus limited, so long as the current-to-voltage converter circuit 103 is configured to convert the current flowing through the photodetector PD1 into a voltage. For example, an alternative configuration may be adopted, in which a resistor is directly connected to the anode of the photodetector PD1.

The present embodiment gives an example in which, in the transmitting unit 20E, the light-emitting diode LED1 is used as a component serving to emit light to the photodetector PD1. However, the present embodiment is not thus limited. The light emitting component may be any device, so long as the device is configured to emit light receivable by the photodetector PD1. For example, the light emitting component may be an incandescent light bulb or an infrared lamp.

<Application Example of Random Number Generating Device>

Figure 15:
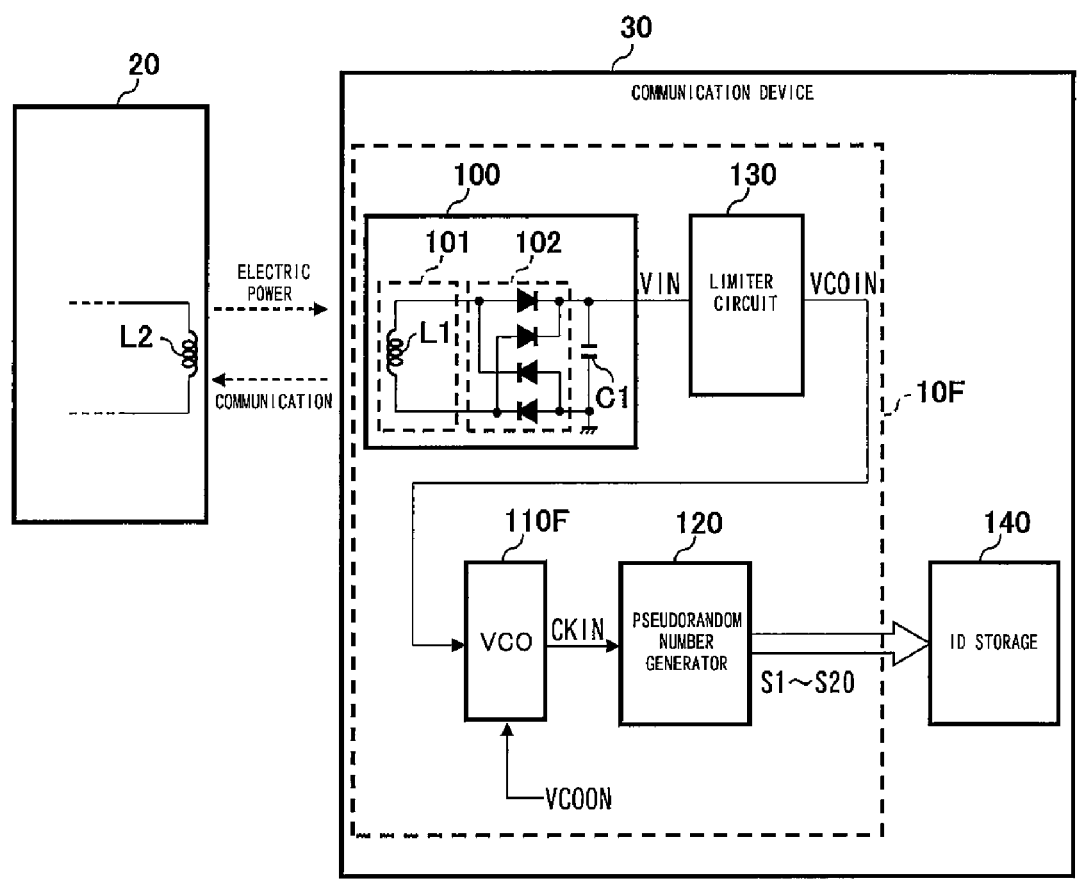
FIG. 15 is a circuit diagram showing an example of a configuration of a communication device to which a random number generating device according to one embodiment of the present invention is applied.

Next, an application example of a random number generating device according to one of the above-described embodiments is described. Described below is an example in which a communication device such as a contactless communication device includes a random number generating device in order to generate an ID (identification number) for the communication device. FIG. 15 is a circuit diagram showing an example of a configuration of a communication device to which a random number generating device according to one embodiment of the present invention is applied.

A random number generating device 10F according to the application example is configured such that, in the random number generating device 10C according to Embodiment 2 (FIG. 6), the voltage controlled oscillator 110 is replaced by a component including an operation input terminal to which the operation signal VCOON is inputted (i.e., replaced by the voltage controlled oscillator 110B in FIG. 5) (in FIG. 14, the voltage controlled oscillator in the present application example is denoted by a reference sign 110F). In the application example, the coil L1 is applied as the receiving mechanism 101 of the receiving unit 100, and the other components of the receiving unit 100 form a suitable circuit configuration (the same circuit configuration as in FIG. 2). A communication device 30 in the present application example is configured such that the reception voltage VIN outputted from the receiving unit 100 can be used as power supply for each component device of the communication device 30.

The communication device 30 according to the present application example includes: the random number generating device 10F configured as previously described; and an ID storage 140 configured to store an ID generated based on a pseudorandom number sequence generated by the pseudorandom number generator 120 of the random number generating device 10F. The ID storage 140 is realized by, for example, an internal memory of the communication device 30. The ID storage 140 stores ID data, which is 20-bit random number data generated by the pseudorandom number generator 120 and outputted from the output terminals S1 to S20. The ID data stored in the ID storage 140 can be transmitted from the coil L1 of the receiving unit 100 to the coil L2 of the transmitting unit 20. Thus, the transmitting unit 20 serves as a power supply for supplying electric power from the coil L2 to the coil L1 of the receiving unit 100 by electromagnetic induction, and also serves as a communication interface for performing ID authentication of the communication device 30.

As described in the above embodiments, while the operation signal VCOON indicates the ON period T1, the voltage controlled oscillator 110F outputs the output signal CKIN having an oscillation frequency based on the induced electromotive force generated at the coil L1 of the receiving unit 100. The pseudorandom number generator 120 generates 20-bit pseudorandom numbers based on the wavenumber (clock number) of the oscillation frequency of the output signal CKIN, and outputs the 20-bit pseudorandom numbers to the output terminals S1 to S20, respectively. That is, each time the operation signal VCOON indicates the ON period T1, the pseudorandom number generator 120 generates pseudorandom numbers and outputs them as random number data. The outputted random number data is sent to the ID storage 140 and stored as ID data. That is, each time the random number data outputted from the pseudorandom number generator 120 is sent to the ID storage 140, the ID data stored in the ID storage 140 is updated. While the operation signal VCOON inputted to the voltage controlled oscillator 110F indicates the OFF period T2, the output signal CKIN is a fixed output (i.e., wavenumber 0), and therefore, the ID data stored in the ID storage 140 is not updated and the ID data generated in the previous ON period T1 is retained.

In the present application example, it is described that the timing of storing the ID data in the ID storage 140 is after the ON period T1 of the operation signal VCOON is ended (i.e., at a given time in the OFF period T2). However, as an alternative, at a certain time in the ON period T1, the pseudorandom number generator 120 may generate pseudorandom numbers based on the wavenumber of the oscillation frequency of the output signal CKIN at the time, and store the pseudorandom numbers in the ID storage 140 as ID data.

According to the communication device 30 with the above-described configuration, when the communication device 30 is brought close to the transmitting unit 20, electric power is supplied to the communication device 30, and induced electromotive force corresponding to the distance between the receiving unit 100 of the communication device 30 and the transmitting unit 20 is generated at the coil L1 of the receiving unit 100. When the operation signal VCOON inputted to the voltage controlled oscillator 110F indicates the ON period T1, the pseudorandom number generator 120 generates random number data based on the induced electromotive force generated at the coil L1, and the random number data is stored in the ID storage 140 as ID data. In particular, the ON period T1 of the operation signal VCOON may include a period in which the communication device 30 is approaching the transmitting unit 20. This makes it possible to further increase the irregularity of the random number data generated by the pseudorandom number generator 120. By sending the stored ID data to the transmitting unit 20 via the coil L1 of the receiving unit 100, the authentication of the communication device 30 is performed by the transmitting unit 20. After the authentication, various communication is performed. Thus, higher safety can be achieved by performing the authentication of the communication device 30 by using highly irregular random number data. It should be noted that the ID data stored in the ID storage 140 may be used in processing that is different from the communication with the transmitting unit 20.

It should be noted that, in the present application example, all of the 20-bit random number data outputted from the output terminals S1 to S20 of the pseudorandom number generator 120 is used. However, the present invention is not thus limited. For example, only several predetermined bits of random number data among the 20-bit data outputted from the output terminals S1 to S20 (e.g., three bits of random number data outputted from the output terminals S1 to S3) may be obtained as ID data and stored in the ID storage 140.

Although the embodiments of the present invention have been described above, the present invention is not limited to the above embodiments, and various improvements, alterations, and modifications can be made to the above embodiments without departing from the spirit of the present invention. For example, components in the plurality of above-described embodiments and variations may be combined in any manner. In the above-described embodiments, the pseudorandom number generator 120 is configured to include an M-sequence bit string operating unit. However, as an alternative, a pseudorandom number generator with any other configuration may be used, so long as the pseudorandom number generator is configured to generate pseudorandom numbers.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structural and/or functional details may be substantially altered without departing from the spirit of the present invention.

<Industrial Applicability>

The random number generating device according to the present invention is useful for generating highly irregular random numbers with a simple configuration.

Reference Signs List 10, 10B, 10C, 10D, 10F random number generating device
20, 20E transmitting unit
21 LED driver
communication device
100, 100E receiving unit
101, 101E receiving mechanism
102 rectifier circuit
103 current-to-voltage converter circuit
104 operational amplifier
110, 110B, 110F voltage controlled oscillator
120 pseudorandom number generator
121 resistor
122 shift register
123 XOR gate
130, 130D limiter circuit
140 ID storage
C1 capacitance element
D1, D2, D3, D4, D5, D6 diode
L1, L2 coil
LED1 light-emitting diode
PD1 photodetector
R1, R2, R3, R4, R5, R6 resistor
VCC1 primary-side power supply
VCC2 secondary-side power supply

What is claimed is:

1. A random number generating device comprising:
receiving circuitry configured to receive, in a contactless manner, energy transmitted from a transmitting unit, and to convert the received energy into a reception voltage;
a voltage controlled oscillator configured to output an oscillating output signal based on the reception voltage;
pseudorandom number generation circuitry configured to generate pseudorandom numbers varying in accordance with an oscillation frequency of the output signal from the voltage controlled oscillator; and
a limiter circuit configured to limit the reception voltage of the receiving circuitry to be in a predetermined voltage range, wherein:
the voltage controlled oscillator is configured to make, based on an operation signal, a switch between an ON period in which the voltage controlled oscillator outputs the output signal based on the reception voltage and an OFF period in which the voltage controlled oscillator outputs the output signal with a predetermined fixed voltage level,
the pseudorandom number generation circuitry is configured to generate pseudorandom numbers varying based on a wavenumber of the output signal that is inputted to the pseudorandom number generation circuitry during the ON period and varies in accordance with a distance between the transmitting unit and the receiving circuitry, and
the limiter circuit has such a temperature-dependent property that an output voltage value varies depending on a temperature.

2. The random number generating device according to claim 1, wherein the receiving circuitry includes a coil configured to receive an electromagnetic wave from the transmitting unit in a contactless manner.

3. The random number generating device according to claim 1, wherein the receiving circuitry includes a photodetector configured to receive light from the transmitting unit in a contactless manner.

4. The random number generating device according to claim 1, wherein the pseudorandom number generation circuitry includes an M-sequence bit string operating circuitry including a shift register and an exclusive OR gate.

5. A random number generating device comprising:
receiving circuitry configured to convert energy applied to receiving circuitry into a reception voltage, the receiving circuitry being configured to receive, in a contactless manner, energy transmitted from a transmitting unit;
a voltage controlled oscillator configured to output an oscillating output signal based on the reception voltage;
a pseudorandom number generation circuitry configured to generate pseudorandom numbers varying in accordance with an oscillation frequency of the output signal from the voltage controlled oscillator; and
a limiter circuit configured to limit the reception voltage of the receiving circuitry to be in a predetermined voltage range, wherein:
the voltage controlled oscillator is configured to make a switch between an ON period in which the voltage controlled oscillator outputs the output signal based on the reception voltage and an OFF period in which the voltage controlled oscillator outputs a predetermined voltage level,
the pseudorandom number generation circuitry is configured to generate pseudorandom numbers varying based on a wavenumber of the output signal that is inputted to the pseudorandom number generation circuitry during the ON period and varies in accordance with a distance between the transmitting unit and the receiving circuitry, and the limiter circuit has such a temperature-dependent property that an output voltage value varies depending on a temperature.

* * * * *